US012592532B2

(12) United States Patent
Meyers

(10) Patent No.: US 12,592,532 B2
(45) Date of Patent: Mar. 31, 2026

(54) CONTACT CLEANING FOR DIFFERENTIAL COMMUNICATION SYSTEMS

(71) Applicant: SEMICONDUCTOR COMPONENTS INDUSTRIES, LLC, Scottsdale, AZ (US)

(72) Inventor: Manuel Hortensia L Meyers, Leuven (BE)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 351 days.

(21) Appl. No.: 18/480,266

(22) Filed: Oct. 3, 2023

(65) Prior Publication Data

US 2025/0112430 A1 Apr. 3, 2025

(51) Int. Cl.

*H03K 17/00* (2006.01)
*H01R 43/00* (2006.01)
*B08B 13/00* (2006.01)

(52) U.S. Cl.

CPC ............ *H01R 43/002* (2013.01); *B08B 13/00* (2013.01)

(58) Field of Classification Search

CPC ...... H08B 13/00; H01R 43/002; H03K 17/30; H03K 17/302; H03K 17/16; H03K 17/161; H03K 17/162; H03K 17/163; H03K 5/08; H03K 17/08; H03K 2017/0803

See application file for complete search history.

(56) References Cited

U.S. PATENT DOCUMENTS

| | | | | |
|---|---|---|---|---|
| 5,688,308 A * | 11/1997 | Voigts | F24F 8/192 | 96/407 |
| 5,761,463 A * | 6/1998 | Allen | G06F 13/4072 | 710/305 |
| 10,819,382 B2 * | 10/2020 | Kain | H03K 5/24 | |
| 2018/0088067 A1 * | 3/2018 | Gupta | G01N 27/028 | |
| 2023/0182752 A1 | 6/2023 | Soriano | | |

FOREIGN PATENT DOCUMENTS

DE 102022001818 B4 3/2024

OTHER PUBLICATIONS

Semiconductor Components Industries, LLC, "3.3 V LVDS High Speed Differential Driver/Receiver", FIN1019/D, Rev. 1, Nov. 2022, 15 pages.

Semiconductor Components Industries, LLC, "High Speed Low Power CAN, CAN FD Transceiver", NCV7344/D, Rev. 4, Aug. 2021, 15 pages.

* cited by examiner

*Primary Examiner* — Tuan T Lam

(74) *Attorney, Agent, or Firm* — Dickinson Wright PLLC

(57) ABSTRACT

A transceiver circuit that includes circuits for cleaning oxidation from input and output pins is disclosed. During a first phase of a cleaning operation, a first cleaner circuit may maintain floating input pins at a voltage level less than a cleaning voltage that is greater than an operating supply voltage. During a second phase of the cleaning operation, the first cleaner circuit may couple the input pins to a ground supply node. A second cleaner circuit may, during the first phase of the cleaning operation, couple the output pins to the cleaning voltage. During the second phase of the cleaning operation, the second cleaner circuit may source respective currents to the output pins.

20 Claims, 7 Drawing Sheets

CONTACT CLEANING FOR DIFFERENTIAL COMMUNICATION SYSTEMS

BACKGROUND

Technical Field

This disclosure is related to cleaning oxide from a connector and, more particularly, to cleaning connectors for a differential bus.

Description of the Related Art

In some applications, portions of an electrical or computer system can be coupled together using multiple signal wires. Such signal wires may be coupled to the components of the electrical or computer system using a two-part connector, where a first part of the connector is inserted into a second part of the connector to form an electrical connection.

Exposure to air, water, etc., can result in an oxide to form at the interface between the first and second parts of a connector. The oxide can increase the impedance between the first part of the connector and the second part of the connector, making the transmission of an electrical signal through the connector difficult, which can lead to failure of the electrical or computer system. To limit the formation of oxide, some connectors are constructed from materials, e.g., gold, that resist oxidation.

SUMMARY

Various embodiments of a transceiver circuit that includes cleaning circuits are disclosed. Broadly speaking, a transceiver circuit may include a logic block and a receiver circuit that may be configured to receive data via a plurality of receiver pins, and send received data to the circuit block. The transceiver circuit may further include a first cleaner circuit that may be configured, in response to an activation of a cleaning mode, to maintain, during a first phase of the cleaning mode, floating receiver pins of the plurality of receiver pins at respective voltage levels that are less than a cleaning voltage. The first cleaner circuit may be further configured to couple the plurality of receiver pins to a ground supply node using a second phase of the cleaning mode.

In another embodiment, the transceiver circuit may further include a transmitter circuit that may be configured to receive transmit data from the logic block and transmit the transmit data via a plurality of transmit pins. The transceiver circuit may additionally include a second cleaner circuit that may be configured, in response to the activation of the cleaning mode, to couple, during the first phase of the cleaning mode, the plurality of transmit pins to the cleaning voltage that is greater than the operating supply voltage, and source respective currents to the plurality of transmit pins during the second phase of the cleaning mode.

BRIEF DESCRIPTION OF THE DRAWINGS

For a detailed description of example embodiments, reference will now be made to the accompanying drawings in which.

Figure 1:
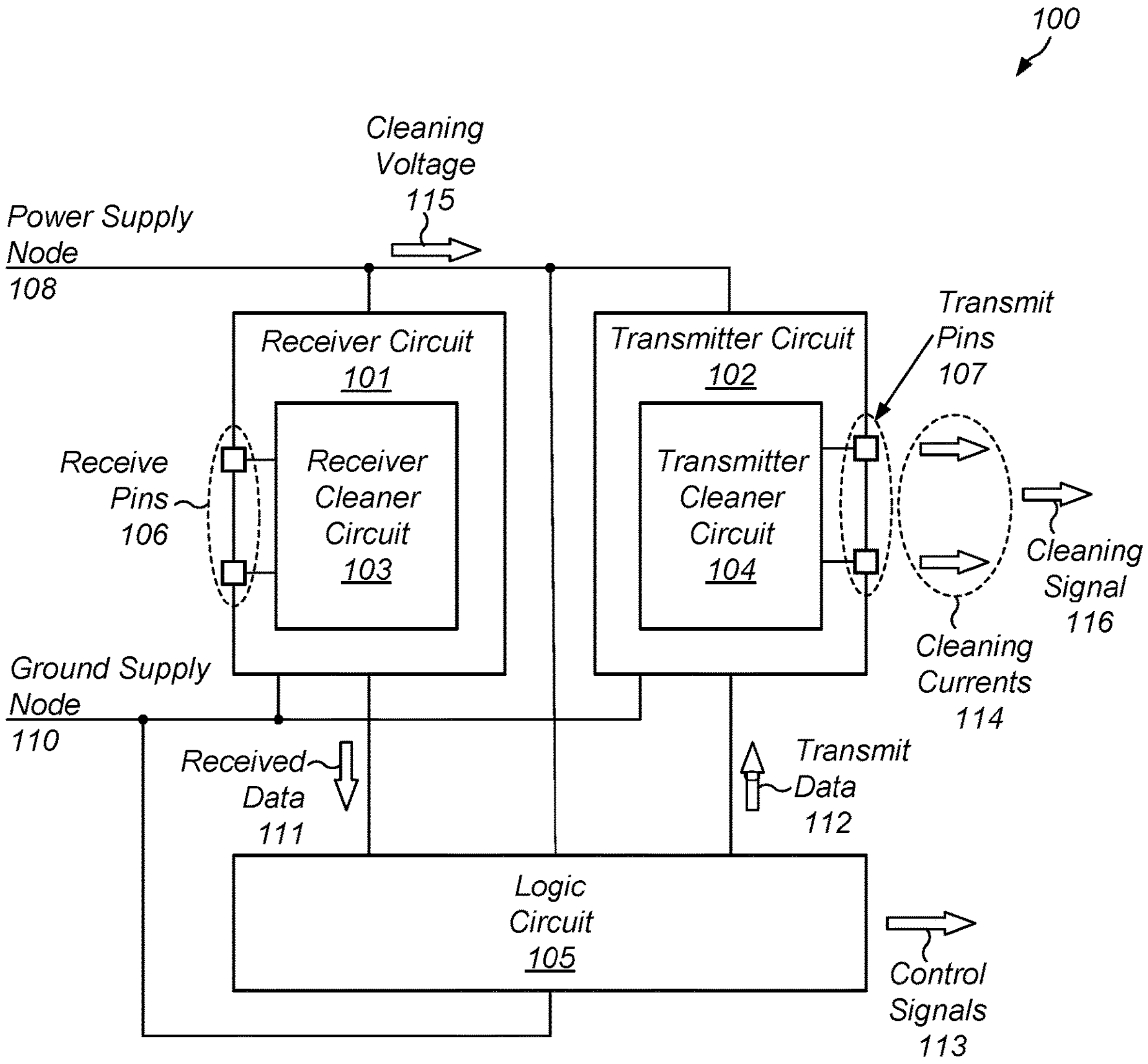
FIG. 1 is a block diagram of an embodiment of a transceiver circuit.

Many of the electrical connections in the drawings are shown as direct couplings having no intervening devices, but not expressly stated as such in the following description. Nevertheless, this paragraph shall serve as antecedent basis in the claims for referencing any electrical connection as "directly coupled" for electrical connections shown in the drawing with no intervening device(s).

Definitions

Various terms are used to refer to particular system components. Different companies may refer to a component by different names—this document does not intend to distinguish between components that differ in name but not function. In the following discussion and in the claims, the terms "including" and "comprising" are used in an open-ended fashion and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"A," "an," and "the," as used herein, refers to both singular and plural referents unless the context clearly dictates otherwise. By way of example, "a processor" programmed to perform various functions refers to one processor programmed to perform each and every function, or more than one processor collectively programmed to perform each of the various functions. Later reference to "the processor," consistent with antecedent basis requirements for claims, shall not negate the fact that the processor may be more than one processor.

In relation to electrical devices (whether stand alone or as part of an integrated circuit), the terms "input" and "output" refer to electrical connections to the electrical devices, and shall not be read as verbs requiring action. For example, a differential amplifier (such as an operational amplifier) may have a first differential input and a second differential input, and these "inputs" define electrical connections to the operational amplifier, and shall not be read to require inputting signals to the operational amplifier.

"Assert" shall mean creating or maintaining a first predetermined state of a Boolean signal. Boolean signals may be asserted high, or with a higher voltage, and Boolean signals may be asserted low, or with a lower voltage, at the discretion of the circuit designer. Similarly, "de-assert" shall mean creating or maintaining a second predetermined state of the Boolean signal, opposite the asserted state.

"FET" shall mean a field-effect transistor, such as a junction-gate FET (JFET) or a metal-oxide semiconductor field effect transistor (MOSFET).

"Closing," in reference to an electrically controlled switch (e.g., a FET), shall mean making the electrically controlled switch conductive. For example, closing a FET used as an electrically controlled switch may mean driving the FET to a full conductive state.

"Opening," in reference to an electrically controlled switch (e.g., a FET), shall mean making the electrically controlled switch non-conductive.

"Controller" or "controller circuit" shall mean, alone or in combination, individual circuit components, an application specific integrated circuit (ASIC), a microcontroller with controlling software, a reduced-instruction-set computer (RISC) with controlling software, a digital signal processor (DSP), a processor with controlling software, a programmable logic device (PLD), a field programmable gate array (FPGA), or a programmable system-on-a-chip (PSOC), configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In some applications, light-emitting diodes (LEDs) have replaced conventional light bulbs. For example, in automotive applications, exterior lighting may be implemented using LEDs that can cover large areas inside or outside a vehicle and can allow for animated color schemes to indicate a state of the vehicle.

To implement such a lighting system, modular LED systems may be employed in which a primary device is connected to multiple secondary devices in a daisy chain fashion. The secondary devices can control one or more LED branches. For example, a secondary device can control between 4 and 20 LED branches, and there may be as many as 128 secondary devices included in the daisy chain.

In many cases, the special requirements needed to integrate a modular LED system into a vehicle may employ multiple connectors to couple together different segments of the modular LED system. To reduce cost, connectors are not coated with gold, but less expensive materials. While the use of the less expensive materials reduces cost, the less expensive materials increase the risk of oxidation of the connectors over time.

When a layer of oxide forms over the surface of a connector, electrical signals used by the primary and secondary devices may be unable to propagate from one device to another, leading to loss of communication between components of the modular LED system and possible malfunction. To reduce the risk associated with using the less expensive connectors, cleaning modes may be employed to maintain low resistances across connectors when oxide forms.

Such cleaning modes can be activated on a regular basis and employ a combination of high voltages (e.g., 10-15 volts) to force any oxide on a connector to break down, and an injection of currents (e.g., 10 mA) for a particular period of time to further remove any remaining oxide. In many systems, a transmitter side of a particular device in a daisy chain may apply the high voltage and currents to the signal wires connected to a receiver side of a different device in the daisy chain.

While such cleaning modes can maintain the operation of a system, i.e., a modular LED system, problems can arise when using certain communication bus structures. In a differential communication bus, information, in the form of bits or symbols of data, is encoded in a voltage difference between two wires or conductors. An oxide buildup on a connector in series with either of the signal lines can result in a communication failure.

In many low-voltage differential signaling ("LVDS") applications, a termination resistor may be employed between the two signal wires. For a cleaning mode to be effective, a voltage level of a pin that is open or electrically floating due to oxide buildup needs to remain low so that the full cleaning voltage is applied across the oxide. When only a single signal wire is affected with oxide in a connector, the applied high voltage during a cleaning mode will cause the voltage level of the unaffected signal wire to increase. The termination resistor inside the receiving device couples the two receiver pins together, which allows the high voltage of the unaffected signal wire to pull up the receiver pin connected to the affected signal wire, reducing the voltage level across the oxide and limiting the effectiveness of the cleaning mode. Additionally, communication needs to remain functional when connections suffer from high impedances due to oxide in order to enable a low impedance path by coupling receiver pins to ground during the cleaning mode.

The embodiments described herein may provide techniques for maintaining, during a cleaning mode, a low voltage level on a receiver pin that is electrically floating due to oxide on a connector coupled in series to a signal wire of a differential communication bus coupled to the receiver pin. Additionally, the embodiment described herein may provide techniques to use the differential communication bus to activate a low impedance path from a transmission side of a particular device to a receiver side of a different device to allow a cleaning current to flow during the cleaning mode. By maintaining floating pins at a low voltage and activating a low impedance during a cleaning mode, the effectiveness of the cleaning mode can be improved for communication buses that employ multiple signal wires.

A block diagram of a transceiver circuit is depicted in FIG. 1. As illustrated, transceiver circuit 100 includes receiver circuit 101, transmitter circuit 102, and logic circuit 105. Receiver circuit 101 includes receive pins 106 and receiver cleaner circuit 103. Transmitter circuit 102 includes transmit pins 107 and transmitter cleaner circuit 104. Receiver circuit 101 and transmitter circuit 102 are coupled to power supply node 108. In various embodiments, a voltage of power supply node 108 can transition from an operating supply voltage to cleaning voltage 115 during a cleaning operation. It is noted that cleaning voltage 115 is sufficiently large to break down an oxide layer formed on connectors coupled to transmit pins 107. For example, in some embodiments, the operating supply voltage may be 5 volts, while cleaning voltage 115 may in the range of 10-15 volts. As used herein the operating supply voltage is a voltage level of power supply node 108 that is used for non-cleaning mode operation.

Receiver circuit 101 is configured to receive data via receive pins 106, and send received data 111 to logic circuit 105 when operating in a non-cleaning data transmission mode. Receiver cleaner circuit 103 is configured, in response to being left electrically floating, to maintain receive pins 106 at respective voltage levels during a first phase of the cleaning mode. In various embodiments, the respective voltage levels are less than cleaning voltage 115. For example, receiver pins 106 may maintained at a voltage of less than 5 volts, while cleaning voltage 115 may in the range of 10-15 volts. In various embodiments, receiver cleaner circuit 103 is further configured to couple receive pins 106 to ground supply node 110 using a second phase of the cleaning mode. In various embodiments, receiver circuit 101 may be configured to receive a cleaning signal via a low-frequency communication protocol on a communication bus coupled to receive pins 106. It is noted that receiver pins 106 are high-voltage tolerant and can be biased at the cleaning voltage without damaging circuits internal to receiver circuit 101.

Transmitter circuit 102 is configured to receive transmit data 112 from logic circuit 105, and send transmit data to other transceiver or controller circuits via transmit pins 107 when operating in a non-cleaning data transmission mode. Transmitter cleaner circuit 104 is configured, in response to the activation of the cleaning mode, to couple transmit pins 107 to cleaning voltage 115 during the first phase of the cleaning mode. In various embodiments, transmitter cleaner circuit 104 is further configured to source cleaning currents 114 to transmit pins 107 during the second phase of the cleaning mode. In some embodiments, transmitter circuit 104 is further configured to send cleaning signal 116 prior to sourcing cleaning currents 114. In various embodiments, transmitter circuit 102 may be configured, during a cleaning operation, to send (or "shift") a cleaning signal or control bits via a low-frequency communication protocol on a communication bus coupled to transmit pins 107. As described below, the cleaning signal or control bits may not propagate to another transceiver circuit due to oxide on a connector or contact has created an open circuit between the transceiver circuits.

It is noted that, in some embodiments, transmitter cleaner circuit 104 may be configured to perform the operations above at substantially the same time as when receiver cleaner circuit 103 is performing the operations described above. In other embodiments, transmitter cleaner circuit 104 may be configured to perform its operations in response to a determination that receiver cleaner circuit 103 has completed its operations.

Logic circuit 105 is configured to process received data 111. In some cases, logic circuit 105 is configured to generate control signals 113 based on received data 111. In response to a determination that received data 111 is intended for a different recipient, logic circuit 105 may generate transmit data 112 based on received data 111. In various embodiments, logic circuit 105 may be implemented using a processor, a controller or microcontroller, a state machine, or any other suitable combination of combinatorial and sequential logic circuits.

Figure 2:
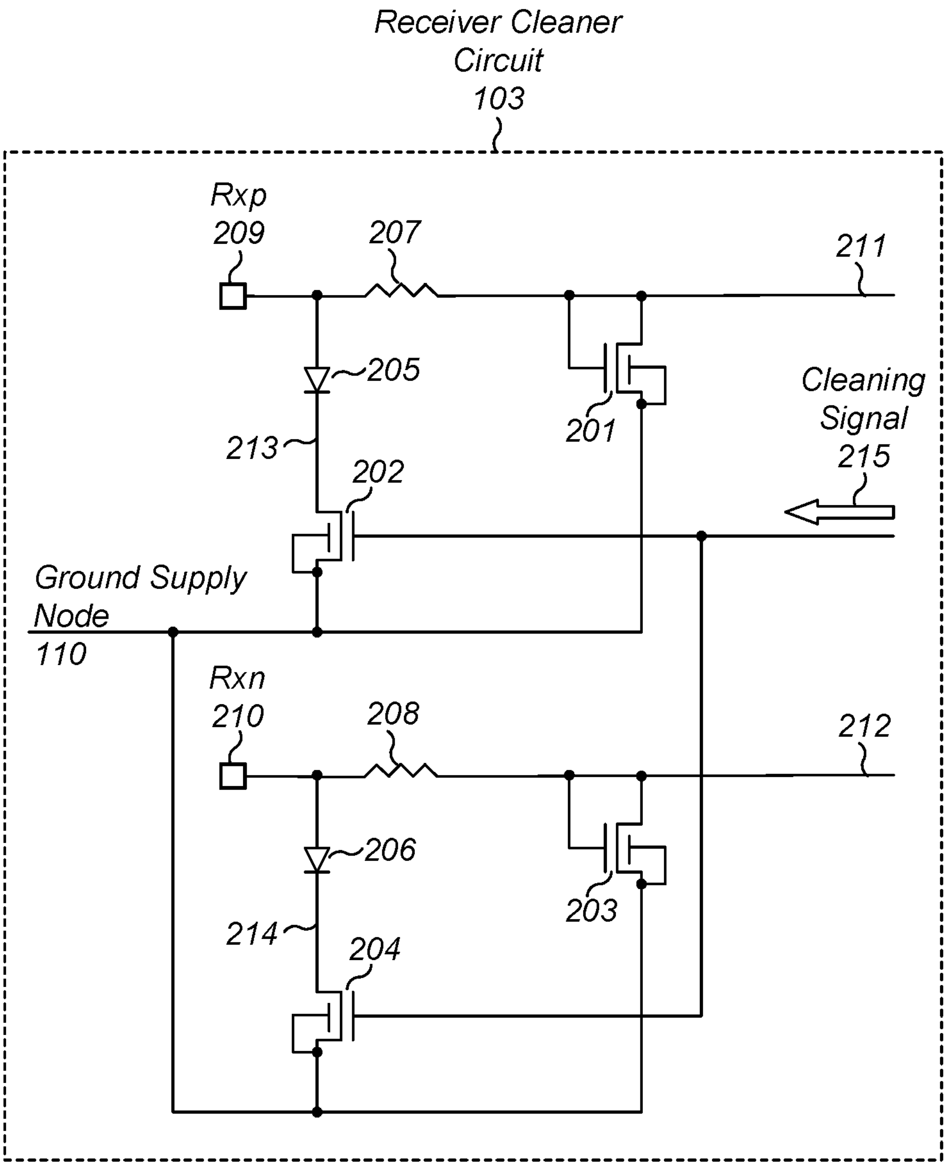
FIG. 2 is a block diagram of an embodiment of a receiver cleaner circuit.

Turning to FIG. 2, a block diagram of an embodiment of receiver cleaner circuit 103 is depicted. As illustrated, receiver cleaner circuit 103 includes transistors 201-204, diodes 205 and 206, and resistors 207 and 208.

Resistor 207 is coupled between pin Rxp 209 and node 211, while resistor 208 is coupled between pin Rxn 210 and node 212. In various embodiments, pin Rxp 209 and pin Rxn 210 may be included in receive pins 106 as depicted in FIG. 1. In various embodiments, nodes 211 and 212 may be coupled to corresponding inputs of a differential amplifier circuit or other suitable comparator circuit to generate received data 111 based on a difference between the respective voltage levels of nodes 211 and 212.

Transistor 201 is coupled between node 211 and ground supply node 110. A control terminal of transistor 201 is also coupled to node 211. In a similar fashion, transistor 203 is coupled between node 212 and ground supply node 110, with its control terminal coupled to node 212. With their control terminals coupled to their drain terminals, transistors 201 and 203 are said to be "diode connected." In various embodiments, transistors 201 and 203 are configured to maintain the voltage levels of node 211 and node 212 when Rxp 209 and Rxn 210 are floating. In various embodiments, the respective voltage levels of nodes 211 and 212 may be multiples of gate-to-source voltages associated with transistors 201 and 203. By maintaining the respective voltage levels of nodes 211 and 212 at such values, a voltage difference sufficient to break down an oxide in connectors coupled to pin Rxp 209 and pin Rxn 210 can be maintained during a first phase of the cleaning mode. For example, if pin Rxp 209 is coupled to a connector that is oxidized, when the cleaning voltage is applied, the transmit side of the connector will be at the cleaning voltage, while pin Rxp 209 will be at a voltage level based on the gate-to-source voltage of transistor 201.

Diode 205 is coupled between pin Rxp 209 and node 213, while diode 206 is coupled between pin Rxn 210 and node 214. Transistor 202 is coupled between node 213 and ground supply node 110, and transistor 204 is coupled between node 214 and ground supply node 110. The control terminals of transistors 202 and 204 are coupled to cleaning signal 215. In response to an activation of cleaning signal 215, transistors 202 and 204 are configured to couple nodes 213 and 214 to ground supply node 110, respectively. With nodes 213 and 214 coupled to ground supply node 110, low impedance paths are available between pins Rxp 209 and Rxn 210 providing a path for cleaning currents to ground. In various embodiments, diodes 205 and 206 allow for negative input voltages on Rxp 209 and Rxn 210 that can result from noise coupling, loss of ground, and the like.

In various embodiments, transistors 201-204 may be implemented as n-channel double-diffused metal-oxide semiconductor ("DMOS") field-effect transistors, or any other suitable transconductance devices. Although transistors 201-204 are depicted as single devices, in other embodiments, any of transistors 201-204 may be implemented using any suitable series and/or parallel combination of transistors.

Diodes 205 and 206 may, in various embodiments, be implemented as discrete diodes coupled to pins Rxp 209 and Rxn 210, respectively. In some embodiments, diodes 205 and 206 may be high-voltage devices capable of having the cleaning voltage applied to their respective anode terminals. In other embodiments, diodes 205 and 206 may be implemented using any suitable PN junction structure available on an integrated circuit which includes transistors 201-204 and the other components of receiver cleaner circuit 103.

Resistors 207 and 208 may, in some embodiments, be implemented as discrete resistors coupled to pins Rxp 209 and Rxn 210, respectively. In other embodiments, resistors 207 and 208 may be implemented using polysilicon, or any other suitable material available on a semiconductor manufacturing process. Although depicted as single resistors, in other embodiments, resistors 207 and 208 may be implemented using any suitable series and/or parallel combination of resistors.

Figure 3:
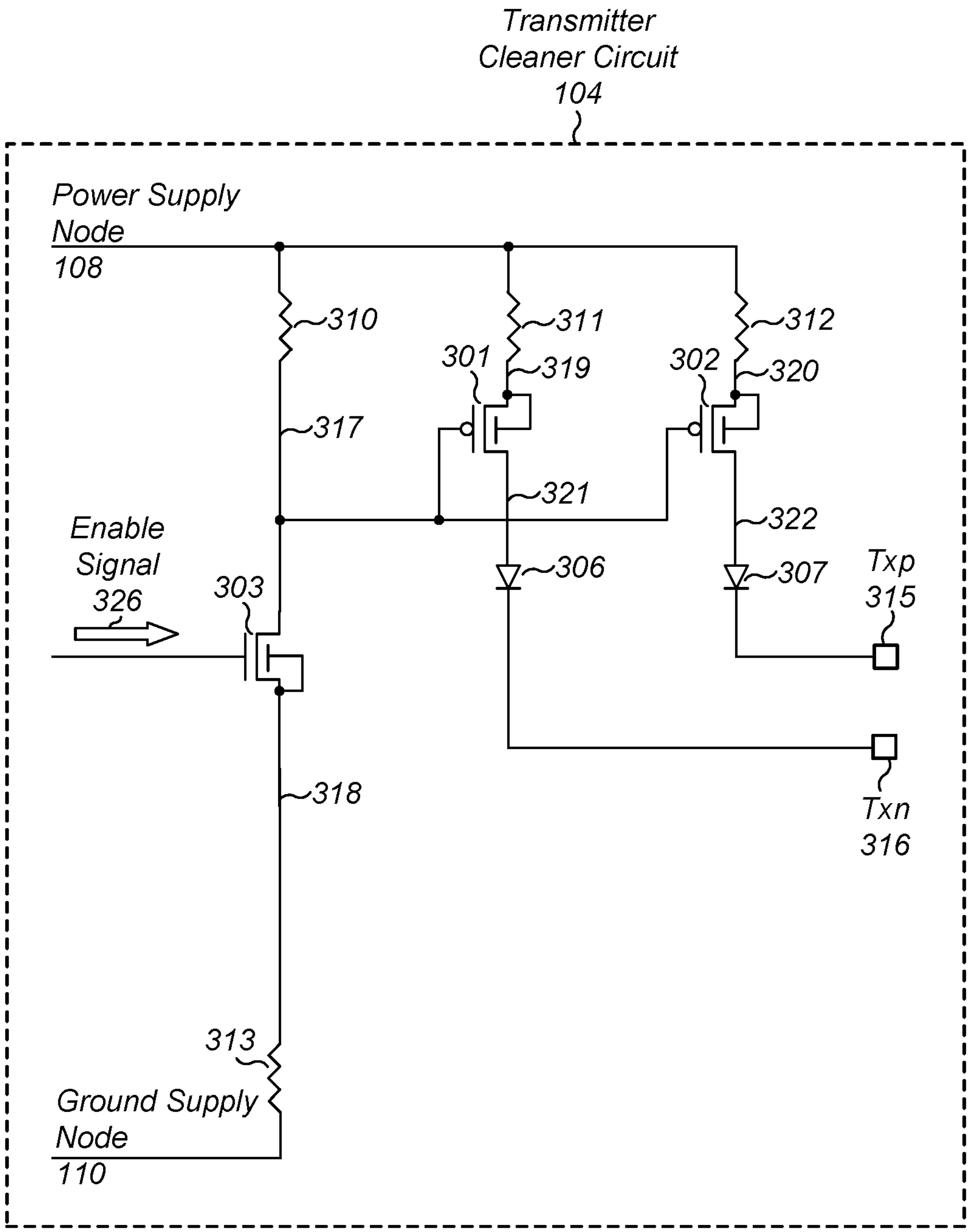
FIG. 3 is a block diagram of an embodiment of a transmitter cleaner circuit.

Turning to FIG. 3, a block diagram of an embodiment of transmitter cleaner circuit 104 is depicted. As illustrated, transmitter cleaner circuit 104 includes transistors 301-303, diodes 306 and 307, and resistors 310-313.

Resistor 311 is coupled between power supply node 108 and node 319, while resistor 312 is coupled between power supply node 108 and node 320. Transistor 301 is coupled between node 319 and node 321, while transistor 302 is coupled between node 320 and node 322. Respective control terminals of transistors 301 and 302 are coupled to node 317.

Diode 306 is coupled between node 321 and pin Txn 316, while diode 307 is coupled between node 322 and pin Txp 315. In various embodiments, pin Txp 315 and pin Txn 316 may be included in transmit pins 107. Diode 306 may be configured to prevent current from flowing from pin Txn 316 into power supply node 108 via transistor 301 and resistor 311. In a similar fashion, diode 307 may be configured to prevent current from flowing from pin Txp 315 into power supply node 108 via transistor 302 and resistor 312.

Resistor 310 is coupled between power supply node 108 and node 317. Transistor 303 is coupled between node 317 and node 318, and is controlled by enable signal 326. Resistor 313 is coupled between node 318 and ground supply node 110. In various embodiments, in response to an activation of enable signal 326, transistor 303 is configured to couple node 317 to node 318. When node 317 is coupled to node 318, a resistive voltage divider is formed by resistors 310 and 313, generating a voltage level on node 317 sufficient to activate transistors 301 and 302. As the voltage on node 317 decreases, transistors 301 and 302 become conductive, coupling nodes 321 and 322 to power supply node 108 via resistors 311 and 312, respectively. As the voltage levels of nodes 321 and 322 increase, so do the voltage levels of pins Txp 315 and Txn 316 until they reach a voltage level at or near cleaning voltage 115.

In response to a deactivation of enable signal 326, transistor 303 is configured to decouple node 317 from node 318. When node 317 is decoupled from node 318, the voltage level of node 317 is increased to a voltage level at or near cleaning voltage 115 due to resistor 310. In response to the increase in the voltage level of node 317, transistors 301 and 302 transition to an off-state, thereby decoupling nodes 321 and 322 from nodes 319 and 320, respectively. Pins Txp 315 and Txn 316 are then free to return to normal operating voltages.

In various embodiments, transistor 303 may be implemented as n-channel DMOS field-effect transistors or any other suitable power MOSFET, and transistors 301 and 302 may be implemented as p-channel DMOS field-effect transistors or any other suitable transconductance devices. Although transistors 301-303 are depicted as single devices, in other embodiments, any of transistors 301-303 may be implemented using any suitable series and/or parallel combination of transistors.

Resistors 310-313 may be implemented using polysilicon, or any other suitable material available on a semiconductor manufacturing process. Although depicted as single resistors, in other embodiments, resistors 310-313 may be implemented using any suitable series and/or parallel combination of resistors.

Diodes 306 and 307 may, in various embodiments, be implemented as high-voltage devices capable of having cleaning voltage 115 applied to their respective anode terminals. In other embodiments, diodes 306 and 307 may be implemented using any suitable PN junction structure available on an integrated circuit which includes transistors 301-303 and the other components of transmitter cleaner circuit 104.

Figure 4:
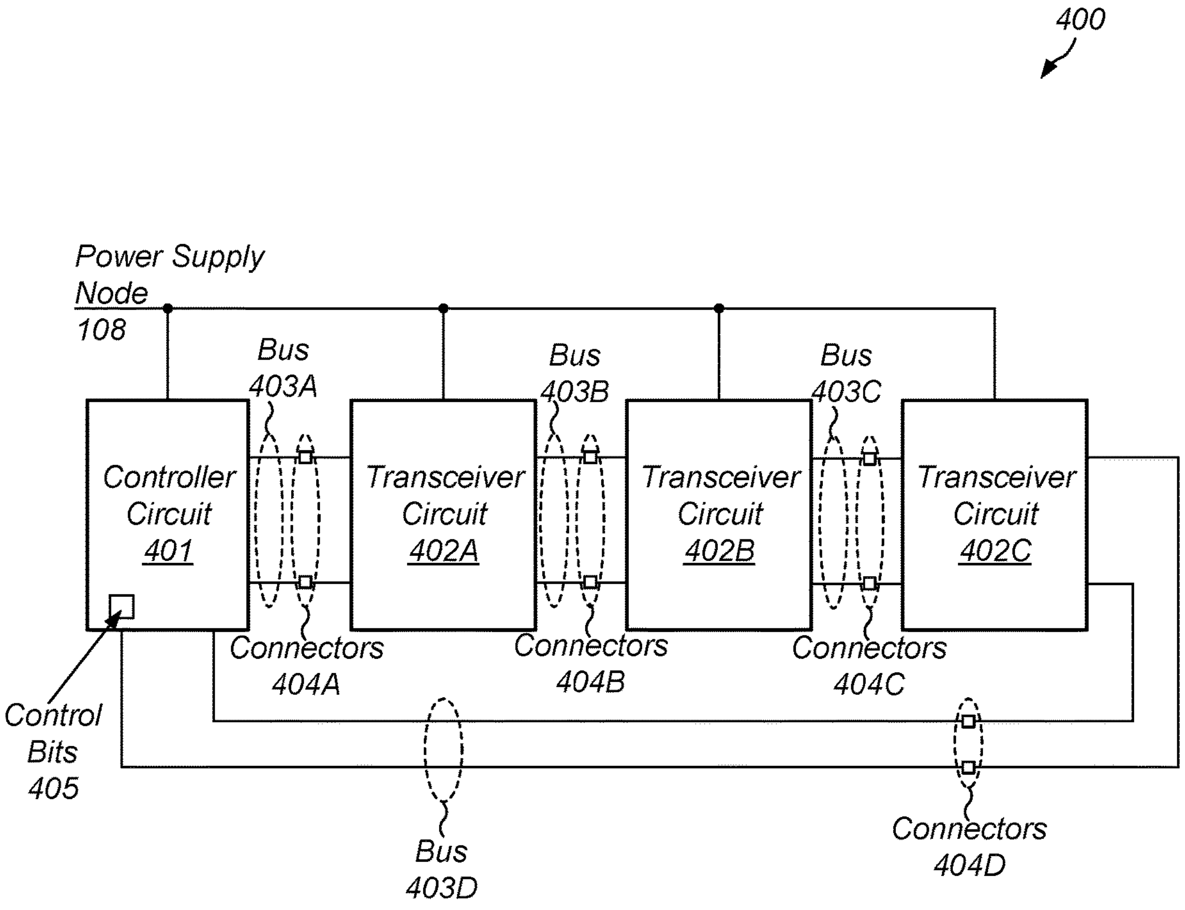
FIG. 4 is a block diagram of an embodiment of a system including multiple transceiver circuits coupled together via a communication bus.

Turning to FIG. 4, a block diagram of an embodiment of a system including multiple transceiver circuits coupled together via a communication bus is depicted. As illustrated, system 400 includes controller circuit 401 and transceiver circuits 402A-402C. In various embodiments, transceiver circuits 402A-402C may be different instances of transceiver circuit 100 as depicted in FIG. 1.

Controller circuit 401 is coupled to transceiver circuit 402A via bus 403A, which is, in turn, coupled to transceiver circuit 402B via bus 403B. Transceiver circuit 402B is coupled to transceiver circuit 402C via bus 403C, and transceiver circuit 402C is coupled to controller circuit 401 via bus 403D. In various embodiments, the arrangement of controller circuit 401 and transceiver circuits 402A-402C depicted in FIG. 4 is referred to as a "daisy chain." Although only three transceiver circuits are depicted in the daisy chain of FIG. 4, in other embodiments, any suitable number of transceiver circuits may be employed. Controller circuit 401 and transceiver circuits 402A-402C are coupled to power supply node 108. In various embodiments, any of transceiver circuits 402A-402C may be coupled to one or more LED branches.

Bus 403A may be split by connectors 404A, while bus 403B may be split by connectors 404B. In a similar fashion, buses 403C and 403D may be split by connectors 404C and 404D, respectively. Although connectors 404A-404D are depicted as each including two connectors, in other embodiments, a number of connectors in a given one of connectors 404A-404D may correspond to a number of signal wires included in buses 403A-403D. As described above, any of connectors 404A-D may develop an oxide layer resulting in a high impedance on a signal wire on corresponding ones of buses 403A-403D. For example, if a particular connector in connectors 404A develops an oxide layer, then an impedance from control circuit 401 to transceiver circuit 402A along a corresponding signal wire of bus 403A may increase to a point where communication between controller circuit 401 and transceiver circuit 402A may not be possible.

Buses 403A-403D may include any suitable number of signal wires or conductors. In various embodiments, buses 403A-403D may each include two signal wires or conductors, and information (e.g., bits or symbols) may be encoded as differences between respective voltage levels of the two wires and conductors in the buses.

Controller circuit 401 may be configured to generate respective commands and data for transceiver circuits 402A-402C. The generated commands and data may be shifted through the transceiver circuits 402A-402C until the last transceiver circuit in the chain receives its corresponding command and data. Alternatively, controller circuit 401 may, in various embodiments, be configured to relay commands and data to different ones of transceiver circuits 402A-402C using bus 403A. In cases where a particular command or portion of data is not intended for transceiver circuit 402A, the particular command or portion of data may be relayed onto the other transceiver circuits along the chain until the particular command or portion of data reaches its intended recipient.

System 400 may, in some embodiments, be used in an environment where oxide may form at receive or transmit pins of any of transceiver circuits 402A-402C. As described above, a cleaning mode may be activated to break through any oxide buildup on the pins and allow the system to continue to operate. In various embodiments, controller circuit 401 may initiate such a cleaning mode during startup of system 400 or during shutdown of system 400. Alternatively, or additionally, controller 401 may initiate the cleaning mode at preset random intervals.

In response to activating a cleaning mode, controller circuit 401 is configured to perform an first phase of an initial cleaning operation by adjusting a voltage level of power supply node 108. To adjust the voltage level of power supply node 108, controller circuit 401 may be further configured to set the voltage level of power supply node 108 to a cleaning voltage level that is determined based on a breakdown voltage of the oxide. In some cases, the cleaning voltage may be greater than an operational voltage level that is used by transceiver circuits 402A-402C to perform non-cleaning operations. In other embodiments, the operational voltage level may be sufficient to breakdown the oxide. In such cases, no adjustment of the voltage level of power supply node 108 is needed during cleaning operations. It is noted that, in some embodiments, transceiver circuit 402A-402C may include respective boost circuits configured to generate the cleaning voltage level locally.

In various embodiments, controller circuit 401 may be further configured to shift control bits 405 through transceiver circuits 402A-402C. In some cases, the control bits cannot pass past one of connectors 404A-404C that has developed an oxide that prevents transmission of the control bits 405. As described above, during the first phase of the initial cleaning operation, each of transceiver circuits 402A-402C apply the cleaning voltage to their respective transmit pins. For example, transceiver circuit 402A will apply the cleaning voltage to its transmit pins coupled to bus 403C. The higher voltage can break down the oxide, allowing control bits 405 to shift through transceiver circuits 402A-402C.

In response to a determination that a first predetermined time period has elapsed, controller circuit 401 is configured to reset transceiver circuits 402A-402C. In various embodiments, to reset transceiver circuits 402A-402C, controller circuit 401 is configured to return the voltage level of power supply node 108 to the operational voltage level. Alternatively, transceiver circuits 402A-402C may be reset by setting the voltage level of power supply node 108 to voltage level lower than the operational voltage that is sufficiently low level that causes subcircuits within transceiver circuits 402A-402C to reset. In such cases, the voltage level of power supply node 108 may be ramped to the operational voltage level to resume non-cleaning operations.

After transceiver circuits 402A-402C have been reset, controller circuit 401 is configured to perform a second phase of the initial cleaning operation by adjusting the voltage level of power supply node 108. As with the first phase, to adjust the voltage level of power supply node 108, controller circuit 401 is further configured to set the voltage level of power supply node 108 to the cleaning voltage level.

To perform the second phase of the initial cleaning operation, controller circuit 401 is further configured to shift control bits 405 through transceiver circuits 402A-402C. Oxide on any of connectors 404A-404C would be broken, allowing control bits to propagate further through transceiver circuits 402A-402C. As described above, transceiver circuits 402A-402C, in response to receiving corresponding ones of control bits 405, are configured to activate a low impedance path to a ground supply node in their corresponding input pins. With their input pins coupled to the ground supply node, a current can flow from the output of one transceiver circuit to the input of the next transceiver circuit in the chain, further cleaning connections 404A-404C.

Controller circuit 401 may continue the second phase of the initial cleaning operation for a second predetermined time period. In response to a determination that the second predetermined time period has elapsed, controller circuit 401 is configured to reset transceiver circuits 402A-402C. As with the first phase, to reset transceiver circuits 402A-402C, controller circuit 401 may be configured to set the voltage level of power supply node 108 back to the operational voltage level or a voltage level lower than the operational voltage that is sufficient to reset subcircuits within transceiver circuits 402A-402C. In such cases, the voltage level of power supply node 108 may be ramped to the operational voltage level to resume non-cleaning operations.

In response to a determination that the second phase of the initial cleaning operation has completed, controller circuit 401 is configured to perform a communication check. In various embodiments, to perform the communication check, controller circuit 401 may verify receipt of one or more of control bits 405 from transceiver circuit 402C. Once the receipt of the one or more of control bits 405 have been verified, controller circuit 401 is configured to determine the communication check passed. If it is not possible to verify the one or more of control bits 405, controller circuit 401 may be configured to determine the communication check failed. It is noted that for embodiments with more than three transceiver circuits, controller circuit 401 may be configured to verify the receipt of one or more of control bits 405 from a last transceiver circuit in the daisy chain. In other embodiments, controller circuit 401 may be configured to shift predetermined test data through transceiver circuits 402A-402C instead of control bits 405 as part of the communication check.

In various embodiments, controller circuit 401 is configured to perform multiple cleaning operations once the cleaning mode has been activated. For example, controller circuit 401 may be configured to perform a second cleaning operation subsequent to the initial cleaning operation in response to a determination that the communication check failed. A maximum number of cleaning operations to be performed while a cleaning mode is active may be predetermined. In such cases, controller circuit 401 may be further configured to terminate the cleaning mode in response to a determination that a predetermined number of cleaning operations have been performed without a successful communication check. Alternatively, controller circuit 401 may be configured to track elapsed time since the start of the cleaning mode. In some embodiments, controller circuit 401 may be further configured to terminate the cleaning mode in response to a determination that the elapsed time exceeds a predetermined threshold value.

Figure 5:
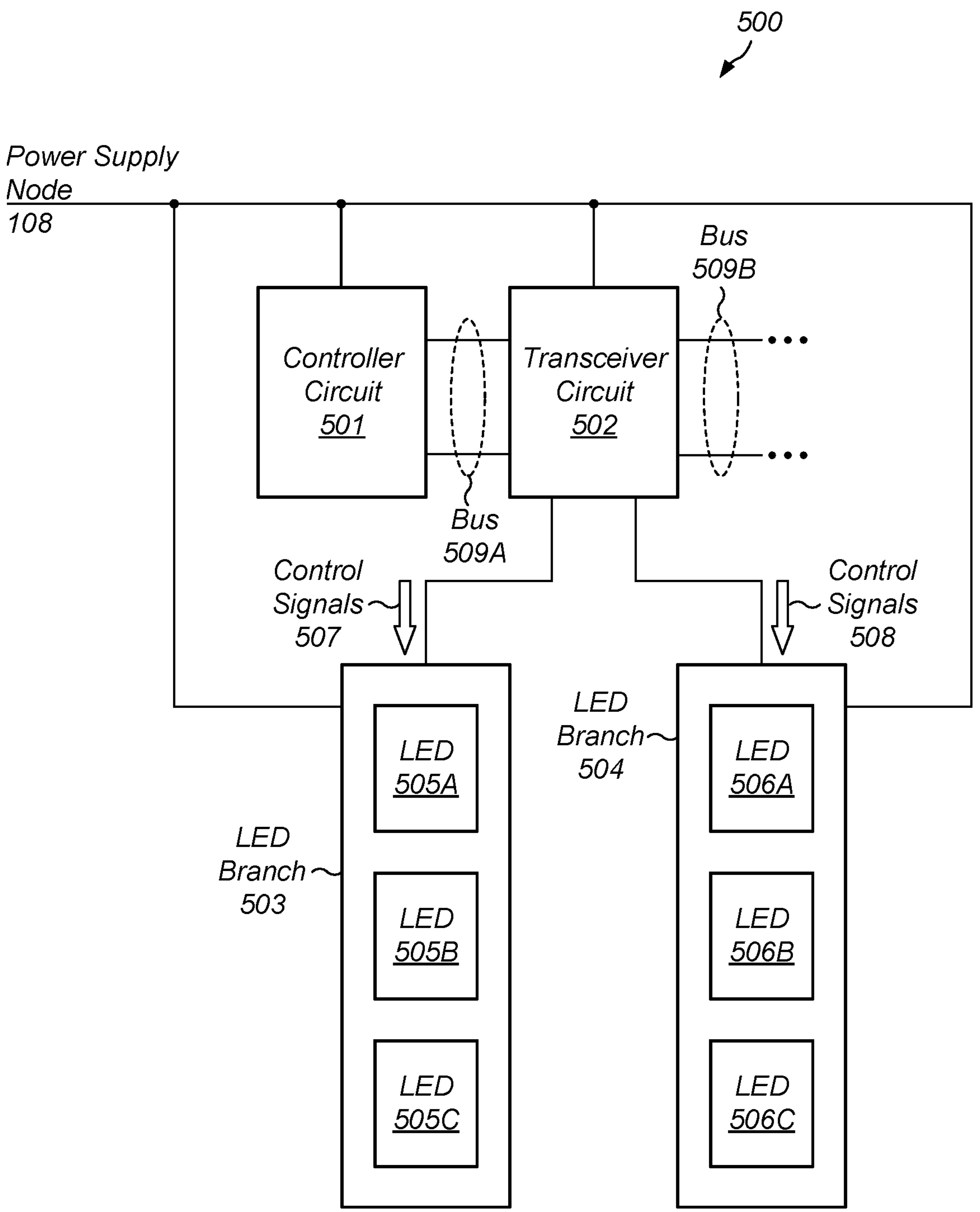
FIG. 5 is a block diagram of an embodiment of a light-emitting diode control system.

A block diagram of an embodiment of a light-emitting diode control system is depicted in FIG. 5. As illustrated, light-emitting diode system 500 includes controller circuit 501, transceiver circuit 502, light-emitting diode branch 503 (denoted as "LED branch 503"), and LED branch 504. It is noted that controller circuit 501, transceiver circuit 502, and LED branches 503 and 504 may, in various embodiments, share a common ground supply node (not pictured).

Controller circuit 501 is coupled to power supply node 108. Additionally controller circuit 501 is coupled to transceiver circuit 502 via bus 506A. In some embodiments, controller circuit 501 is configured to send commands to transceiver circuit 502 via bus 509A. In various embodiments, the commands may include instructions to activate different ones of LEDs 505A-505C included in LED branch 503, and LEDs 506A-506C in LED branch 504. Additionally, the commands may include a cleaning signal that activates a cleaning mode in transceiver circuit 502. In different embodiments, bus 509A may be a differential communication bus in which information is encoded as a difference between respective voltage levels of two wires or conductors included in bus 509A. It is noted that although bus 509A is depicted as including two wires or conductors, in other embodiments, any suitable number of wires or conductors may be employed.

Transceiver circuit 502 is coupled to power supply node 108, and LED branches 503 and 504. Although transceiver circuit 502 is depicted as being coupled to two LED branches in the embodiment of FIG. 5, in other embodiments, transceiver circuit 502 may be coupled to any suitable number of LED branches. Transceiver circuit 502 is further coupled to controller circuit 501 via bus 509A. Additionally, transceiver circuit 502 may be coupled to another transceiver circuit via bus 509B. In some cases, transceiver circuit 502 may be coupled to multiple other transceiver circuits and controller circuit 501 in a daisy chain fashion.

In various embodiments, transceiver circuit 502 may be configured to generate control signals 507 and 508 based on commands received from controller circuit 501. Transceiver circuit 502 may be further configured to relay, using bus 509B, commands received via bus 509A that are intended for other transceiver circuits. In other embodiments, transceiver circuit 502 may be configured to perform cleaning operations in response to activation of a cleaning mode as described above in regard to FIG. 1.

LED branches 503 and 504 are coupled to power supply node 108. In some embodiments, LED branches 503 and 504 are configured to draw power from power supply node 108. In other embodiments, LED branches 503 and 504 may be configured to draw at least some power from control signals 507 and 508, respectively. LED branch 503 includes LEDs 505A-505C, and LED branch 504 includes LEDs 506A-506C. Although LED branches 503 and 504 are depicted as each including three LEDs, in other embodiments, LED branches 503 and 504 can include any suitable number of LEDs, and the number of LEDs in LED branch 503 may be different than the number of LEDs in LED branch 504. In various embodiments, LED branch 503 is configured to activate one or more of LEDs 505A-505C using control signals 507. In a similar fashion, LED branch 504 is configured to activate one or more of LEDs 506A-506C using control signals 508. As used herein, to activate an LED refers to applying any suitable combination of voltages and/or currents to the LED in order to cause the LED to combine electron-hole pairs to generate photons. In some cases, LEDs 505A-505C and LEDs 506A-506C may, when activated, emit photons that correspond to a common wavelength of light. In other cases, different ones of LEDs 505A-505C and 506A-506C may emit photons of different energies corresponding to different wavelengths and, therefore, colors of light. In some embodiments, any suitable number of LEDs 505A-505C and 506A-506C can be activated, based on control signals 507 and 508, respectively, at different times.

Figure 6:
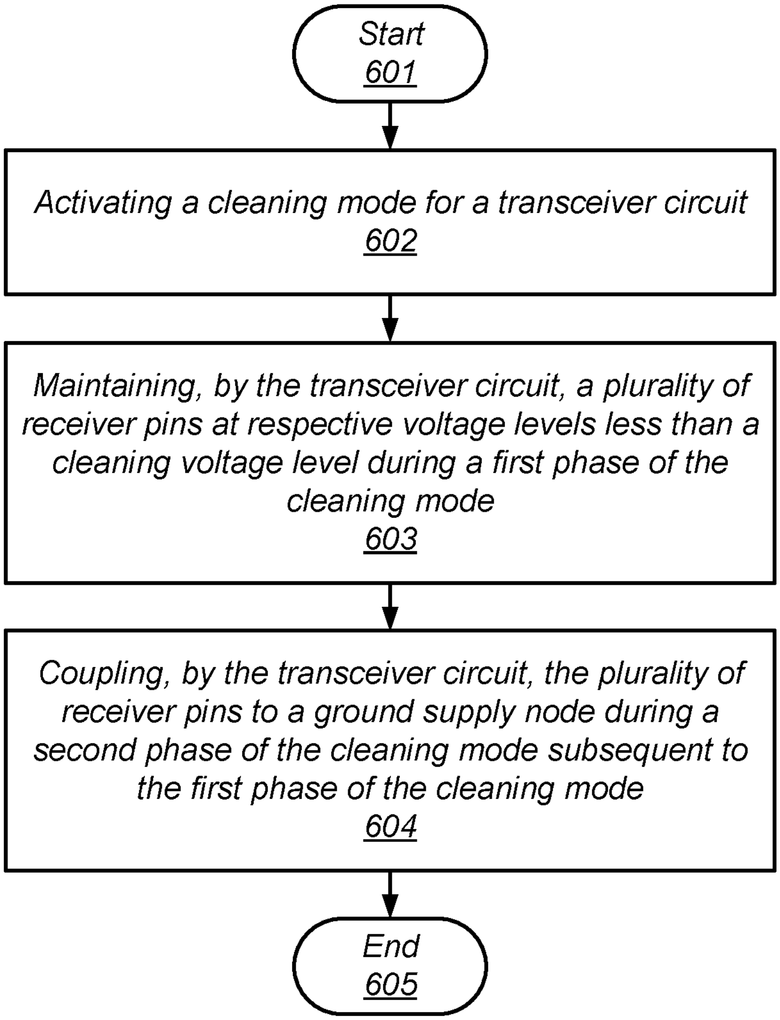
FIG. 6 is a flow diagram depicting an embodiment of a method for a transceiver circuit to perform a cleaning operation.

Turning to FIG. 6, a flow diagram depicting an embodiment of a method for a transceiver circuit to perform a cleaning operation is illustrated. The method, which may be applied to various transceiver circuits, e.g., transceiver circuit 100, begins in block 601.

The method includes activating a cleaning mode for a transceiver circuit (block 602). In various embodiments, activating the cleaning mode includes asserting a cleaning signal or a dedicated control signal coupled to the transceiver circuit. In various embodiments, the method may include receiving, by the transceiver circuit, the cleaning signal from a controller circuit via a communication bus coupled between the transceiver circuit and the controller circuit. In other embodiments, the method may include receiving, by the transceiver circuit, the cleaning signal from a different transceiver circuit via a communication bus coupled between the transceiver circuit and the different transceiver circuit.

The method also includes maintaining, by the transceiver circuit, respective voltage levels of a plurality of receiver pins at corresponding voltage levels less than a cleaning voltage during a first phase of the cleaning mode (block 603). In some embodiments, maintaining respective voltage levels of the plurality of receiver pins at corresponding voltage levels less than a cleaning voltage level during a first phase of the cleaning mode includes coupling, by the transceiver circuit, the plurality of receiver pins to ground via corresponding ones of a plurality of diode-connected transistors.

The method further includes coupling, by the transceiver circuit, the plurality of receiver pins to a ground supply node during a second phase of the cleaning mode subsequent to the first phase of the cleaning mode (block 604). In some embodiments, the method may further include activating, by the transceiver circuit, the second phase in response to determining a predetermined time period has elapsed since activating the first phase. In some embodiments, the predetermined time may be selected based on a time required for an oxide on a contact to break down. In various embodiments, coupling the plurality of receiver pins to the ground supply node includes activating a plurality of transistors coupled between the ground supply node and corresponding ones of the plurality of receiver pins. In some embodiments, the method includes activating the plurality of transistors in response to receiving a control signal.

In various embodiments, the method may also include coupling a plurality of transmit pins included in the transceiver circuit to the cleaning voltage during the first phase of the cleaning mode, and sourcing respective currents to the plurality of transmit pins during the second phase of the cleaning mode. In some embodiments, the method may also include transmitting, via the plurality of transmit pins, a control signal to activate a cleaning mode in a different transceiver circuit prior to coupling the plurality of transmit pins to the cleaning voltage. In different embodiments, coupling the plurality of transmit pins to the cleaning voltage includes activating, for a particular period of time, a plurality of transistors coupled between a high-voltage power supply node and corresponding ones of the plurality of transmit pins. A voltage level of the high-voltage power supply node may, in various embodiments, correspond to the cleaning voltage.

It is noted that the operations performed on the transmit pins may, in some embodiments, be performed at substantially the same time as the operations performed on the receiver pins. In some embodiments, however, the operations performed on the transmit pins may be performed subsequent to the operations performed on the receiver pins, or vice versa. The method concludes in block 605.

Figure 7:
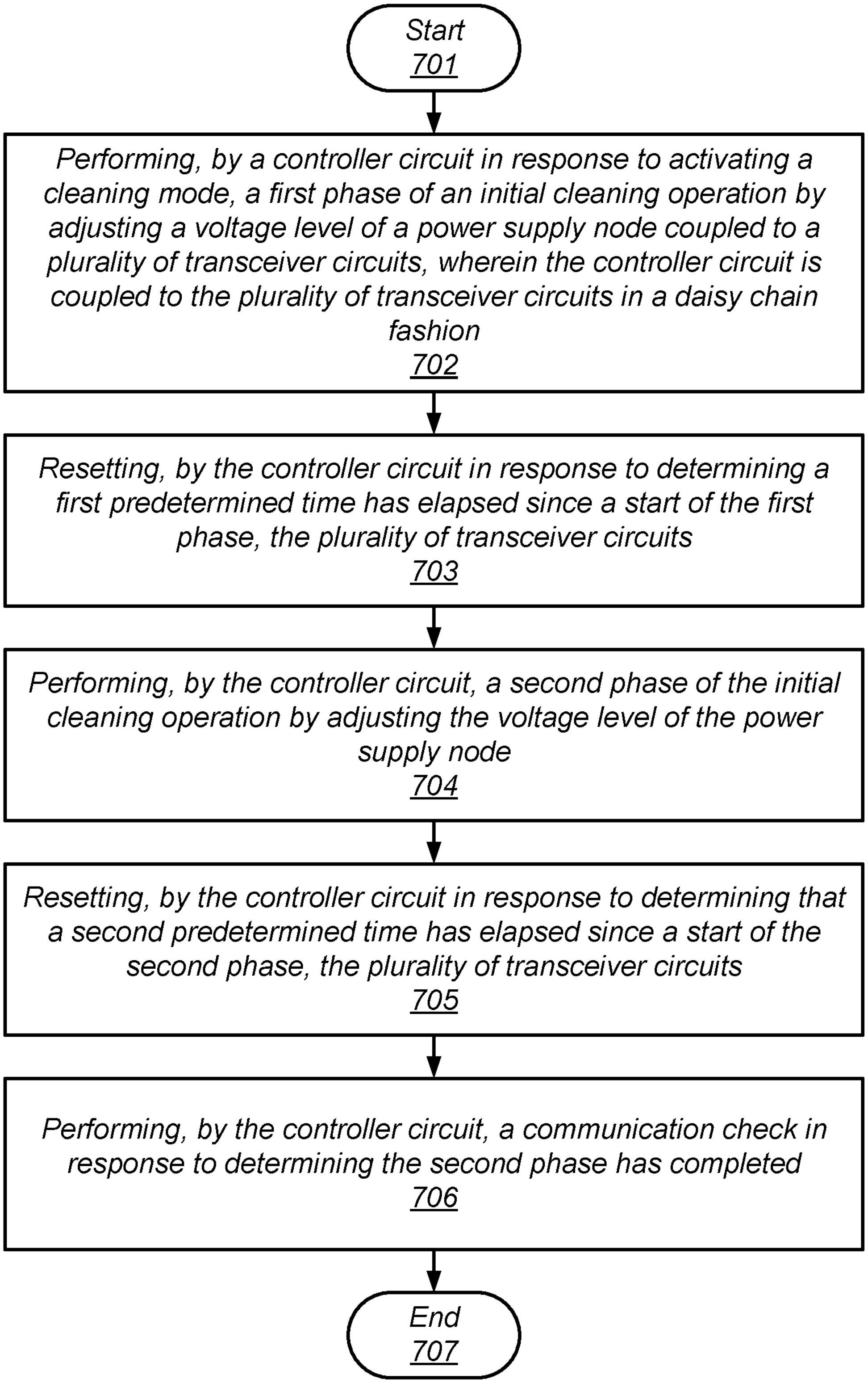
FIG. 7 is a flow diagram depicting an embodiment of a method for performing a cleaning operation for a system of transceiver circuits.

Turning to FIG. 7, a flow diagram depicting an embodiment of a method for performing a cleaning operation for a system of transceiver circuits is illustrated. The method, which may be applied to various systems such as system 400, begins in block 701.

The method includes, performing, by a controller circuit in response to activating a cleaning mode, a first phase of an initial cleaning operation by adjusting a voltage level of a power supply node coupled to a plurality of transceiver circuits (block 702). In various embodiments, the plurality of transceiver circuits and the controller circuit are coupled together in a daisy chain fashion. It is noted that the initial cleaning operation for a given transceiver circuit of the plurality of transceiver circuits may include any or all of the operations depicted in the flow diagram of FIG. 6. In some embodiments, adjusting the voltage level of the power supply node includes setting the voltage level of the power supply node to a cleaning voltage level that is greater than an operational voltage level used by the plurality of transceiver circuits for non-cleaning operations.

The method also includes resetting, by the controller circuit in response to determining that a first predetermined time has elapsed since a start of the first phase, the plurality of transceiver circuits (block 703). In various embodiments, resetting the plurality transceiver circuits includes returning the voltage of the power supply node to the operational voltage level.

The method further includes performing, by the controller circuit, a second phase of the initial cleaning operation by adjusting the voltage level of the power supply node (block 704). In various embodiments, adjusting the voltage level of the power supply node includes setting the voltage level of the power supply node to the cleaning voltage level. In some embodiments, performing the second phase of the cleaning operation includes shifting, by the controller circuit via a differential communication bus, control bits through the plurality of transceiver circuits. In other embodiments, a dedicated cleaning control signal separate from the differential communication bus may be employed.

The method may further include, activating, by a given transceiver circuit in response to receiving at least one control bit, a low impedance path to a ground supply node for at least one input pin of the given transceiver circuit. In various embodiments, activating the low impedance path to the ground supply node may include activating, by the given transceiver circuit, a transistor coupled between the at least one input pin and the ground supply node.

The method also includes resetting, by the controller circuit in response to determining that a second predetermined time has elapsed since a start of the second phase, the plurality of transceiver circuits (block 705). In various embodiments, resetting the plurality of transceiver circuits includes returning the voltage level of the power supply node to the operational voltage level.

The method further includes performing, by the controller circuit, a communication check in response to determining the second phase has completed (block 706). In some embodiments, performing the communication check may include checking, by the controller circuit, for the receipt of the control bits from a last transceiver circuit of the plurality of transceiver circuits. Alternatively, performing the communication check may include sending, by the controller circuit, test data through the plurality of transceiver circuits and verifying that the test data is returned from the last transceiver circuit.

The method may further include performing a second cleaning operation subsequent to the initial cleaning operation in response to determining the communication check failed. In some embodiments, the method may further include terminating, by the controller circuit, the cleaning mode in response to determining that a predetermined number of cleaning operations have been performed without a successful communication check. In other embodiments, terminating the cleaning mode may include issuing an error message by the controller circuit. The method concludes in block 707.

The present disclosure includes references to "an embodiment" or groups of "embodiments." As used herein, embodiments are different implementations of instances of the disclosed concepts. References to "an embodiment," "some embodiments," and the like do not necessarily refer to the same embodiment. Many embodiments are possible and contemplated, including those specifically disclosed as well as modifications or alternatives that fall within the spirit or scope of the disclosure.

The above disclosure is meant to illustrate the principles and various embodiments of the disclosed concepts. Numerous variations and modifications will become apparent to those skilled in the art once the above disclosure is fully appreciated. It is intended that the following claims be interpreted to embrace all such variations and modifications.

What is claimed is:

1. An apparatus, comprising:

a logic circuit;

a receiver circuit configured to:

receive data via a plurality of receiver pins; and send received data to the logic circuit; and a first cleaner circuit configured, in response to an activation of a cleaning mode, to:

maintain receiver pins of the plurality of receiver pins at respective voltage levels during a first phase of the cleaning mode, wherein the respective voltage levels are less than a cleaning voltage; and couple the plurality of receiver pins to a ground supply node during a second phase of the cleaning mode.

2. The apparatus of claim 1, further comprising:

a transmitter circuit configured to:

receive transmit data from the logic circuit; and transmit the transmit data via a plurality of transmit pins; and a second cleaner circuit configured, in response to the activation of the cleaning mode, to:

couple the plurality of transmit pins to the cleaning voltage during the first phase of the cleaning mode; and source respective currents to the plurality of transmit pins during the second phase of the cleaning mode.

3. The apparatus of claim 2, wherein the logic circuit, the receiver circuit, the transmitter circuit, the first cleaner circuit, and the second cleaner circuit are included in a transceiver circuit.

4. The apparatus of claim 2, wherein the first cleaner circuit is included in the receiver circuit, and wherein the second cleaner circuit is included in the transmitter circuit.

5. The apparatus of claim 2, wherein to couple the plurality of transmit pins to the cleaning voltage during the second phase of the cleaning mode, the second cleaner circuit is further configured to activate, for a predetermined time period, a plurality of transistors coupled between a power supply node and corresponding ones of the plurality of transmit pins, wherein a voltage of the power supply node is the cleaning voltage.

6. The apparatus of claim 1, wherein the receiver circuit is configured to receive a plurality of control bits, and wherein the transmitter circuit is configured to relay at least a portion of the plurality of control bits.

7. The apparatus of claim 1, wherein to maintain the receiver pins at the respective voltage levels, the receiver circuit is further configured to maintain the receiver pins at their respective voltage levels using corresponding ones of a plurality of diode-connected transistors.

8. The apparatus of claim 1, wherein to couple the plurality of receiver pins to the ground supply node during the second phase of the cleaning mode, the first cleaner circuit is further configured, in response to receiving control bits, to activate a plurality of transistors coupled between the ground supply node and corresponding ones of the plurality of receiver pins.

9. A method, comprising:

activating a cleaning mode for a transceiver circuit;

maintaining, by the transceiver circuit, respective voltage levels of a plurality of receiver pins at corresponding voltage levels less than a cleaning voltage during a first phase of the cleaning mode; and coupling, by the transceiver circuit, the plurality of receiver pins to a ground supply node during a second phase of the cleaning mode, wherein the second phase of the cleaning mode is subsequent to the first phase of the cleaning mode.

10. The method of claim 9, further comprising:

coupling, by the transceiver circuit, a plurality of transmit pins to the cleaning voltage during the first phase of the cleaning mode; and sourcing, by the transceiver circuit, respective currents to the plurality of transmit pins during the second phase of the cleaning mode.

11. The method of claim 10, further comprising, transmitting, via the plurality of transmit pins, at least a portion of a plurality of previously received control bits.

12. The method of claim 10, wherein coupling the plurality of transmit pins to the cleaning voltage includes activating, for a predetermined time period, a plurality of transistors coupled between a high-voltage power supply node and corresponding ones of the plurality of transmit pins, wherein a voltage of the high-voltage power supply node is the cleaning voltage.

13. The method of claim 10, further comprising, activating, by the transceiver circuit, the second phase in response to determining a predetermined time period has elapsed since activating the first phase.

14. The method of claim 9, wherein maintaining the respective voltage levels of the plurality of receiver pins at corresponding voltage levels less than the cleaning voltage during the first phase of the cleaning mode includes coupling, by the transceiver circuit, the plurality of receiver pins to ground via corresponding ones of a plurality of diode-connected transistors.

15. The method of claim 9, wherein coupling the plurality of receiver pins to the ground supply node includes, in response to receiving control bits, activating a plurality of transistors coupled between the ground supply node and corresponding ones of the plurality of receiver pins.

16. An apparatus, comprising:

a logic circuit;

a receiver cleaner circuit configured to:

receive data via a plurality of receiver pins; and send received data to the logic circuit; and in response to an activation of a cleaning mode, to:

maintain the receiver pins at respective voltage levels during a first phase of the cleaning mode, wherein the respective voltage levels are less than a cleaning voltage; and couple the receiver pins to a ground supply node during a second phase of the cleaning mode.

17. The apparatus of claim 16, further including a plurality of transmit pins coupled to a transmitter cleaner circuit for transmitting cleaning currents, the logic circuit connected to the transmitter cleaner circuit to send transmit data to the transmitter cleaner circuit.

18. The apparatus of claim 17, further including a plurality of diodes connected to the transmit pins in the transmitter cleaner circuit to prevent current flow to a power supply node.

19. The apparatus of claim 16, further including a plurality of transistors in the receiver cleaner circuit to maintain voltage node levels when the receiver pins are floating.

20. The apparatus of claim 19, wherein the voltage node levels are voltage multiples of the gate-to-source voltages of the transistors.

* * * * *